US009932098B1

(12) United States Patent
Andrasko et al.

(10) Patent No.: US 9,932,098 B1
(45) Date of Patent: Apr. 3, 2018

(54) SYSTEMS AND METHODS FOR CONTINUOUSLY ADAPTING A TOE ANGLE BETWEEN MARINE PROPULSION DEVICES

(71) Applicant: Brunswick Corporation, Lake Forest, IL (US)

(72) Inventors: Steven J. Andrasko, Oshkosh, WI (US); Kenneth G. Gable, Oshkosh, WI (US); Michael J. Lemancik, Oshkosh, WI (US)

(73) Assignee: Brunswick Corporation, Mettawa, IL (US)

( * ) Notice: Subject to any disclaimer, the term of this patent is extended or adjusted under 35 U.S.C. 154(b) by 0 days.

(21) Appl. No.: 14/843,439

(22) Filed: Sep. 2, 2015

(51) Int. Cl.
*B63H 20/12* (2006.01)
*G05D 1/02* (2006.01)
*B63H 20/00* (2006.01)

(52) U.S. Cl.
CPC ........... *B63H 20/12* (2013.01); *G05D 1/0206* (2013.01); *B63H 2020/003* (2013.01)

(58) Field of Classification Search
CPC .... B63H 21/213; B63H 20/12; B63H 21/265; B63H 25/02; B63H 20/08; B63H 21/21; B63H 21/22; B63H 25/28; B63H 25/30; B63H 25/42; B63H 25/46; E21B 7/067; E21B 7/10; G05D 1/0875; B25B 13/48; B60T 8/171
USPC ................. 701/21, 70; 114/144 R, 150, 172; 175/76; 440/1, 58, 61 S; 280/86.75, 280/86.758; 303/11; 702/189; 73/49.2; 1/1; 81/58.2
See application file for complete search history.

(56) References Cited

U.S. PATENT DOCUMENTS 5,027,275 A * 6/1991 Sakamoto ............. G01M 17/06
280/86.758
5,085,603 A 2/1992 Haluzak
5,167,546 A 12/1992 Whipple
(Continued)

OTHER PUBLICATIONS

Andrasko et al., Systems and Methods for Controlling Movement of Drive Units on a Marine Vessel, Unpublished U.S. Appl. No. 14/177,762, filed Feb. 11, 2014.
(Continued)

*Primary Examiner* — Anne M Antonucci
*Assistant Examiner* — Sanjeev Malhotra
(74) *Attorney, Agent, or Firm* — Andrus Intellectual Property Law, LLP

(57) ABSTRACT

Systems and methods for reducing steering pressures of marine propulsion device steering actuators are disclosed. First and second sensors sense first and second conditions of first and second steering actuators. A third sensor senses an operating characteristic of the marine vessel. A controller is in signal communication with the first, second, and third sensors. In response to the marine vessel travelling generally straight ahead, the controller determines a target toe angle between the first and second marine propulsion devices based on the operating characteristic. The controller commands the first and second steering actuators to position the first and second marine propulsion devices at the target toe angle. The controller thereafter gradually adapts the target toe angle between the first and second marine propulsion devices until the controller determines that an absolute difference between the first condition and the second condition reaches a calibrated value.

19 Claims, 6 Drawing Sheets

(56) References Cited

U.S. PATENT DOCUMENTS

| | | | |
|---|---|---|---|
| 5,263,432 A | 11/1993 | Davis | |
| 5,557,525 A * | 9/1996 | Miichi | B60G 3/26 280/86.75 |
| 5,685,253 A | 11/1997 | Alexander, Jr. | |
| 6,276,977 B1 | 8/2001 | Treinen et al. | |
| 6,821,168 B1 * | 11/2004 | Fisher | B63H 20/12 114/150 |
| 6,994,046 B2 | 2/2006 | Kaji et al. | |
| 7,033,234 B2 | 4/2006 | Arvidsson | |
| 7,150,664 B1 | 12/2006 | Uppgard et al. | |
| 7,255,616 B1 | 8/2007 | Caldwell | |
| 7,267,588 B1 * | 9/2007 | Griffiths | B63H 21/265 114/172 |
| 7,311,571 B1 | 12/2007 | Swan et al. | |
| 7,416,458 B2 | 8/2008 | Seumori et al. | |
| 7,429,202 B2 | 9/2008 | Yazaki et al. | |
| 7,467,595 B1 * | 12/2008 | Lanyi | B63H 21/213 114/144 R |
| 7,527,538 B2 * | 5/2009 | Mizutani | B63H 20/12 440/1 |
| 7,699,674 B1 * | 4/2010 | Wald | B63H 25/30 440/58 |
| 7,883,383 B2 | 2/2011 | Larsson | |
| 8,046,122 B1 | 10/2011 | Barta et al. | |
| 8,512,085 B1 | 8/2013 | Kobilic | |
| 9,156,535 B2 | 10/2015 | Mizutani | |
| 9,290,252 B1 * | 3/2016 | Tuchscherer | B63H 20/08 |
| 2009/0091180 A1 * | 4/2009 | Iwasaki | B60T 8/171 303/11 |
| 2009/0260488 A1 * | 10/2009 | Kanazawa | B25B 13/48 81/58.2 |
| 2010/0030411 A1 * | 2/2010 | Wilson | G05D 1/0875 701/21 |
| 2010/0163311 A1 * | 7/2010 | Tulloch | E21B 7/10 175/76 |
| 2012/0135649 A1 * | 5/2012 | Morvillo | B63H 20/12 440/61 S |
| 2012/0197467 A1 * | 8/2012 | Morvillo | B63H 11/107 701/21 |
| 2012/0247381 A1 * | 10/2012 | Winiski | B63H 20/12 114/144 R |
| 2012/0283993 A1 * | 11/2012 | Schlachter | G01F 1/363 702/189 |
| 2014/0106632 A1 | 4/2014 | Nakayasu | |
| 2014/0260556 A1 * | 9/2014 | Gray | A61M 5/14224 73/49.2 |
| 2015/0336551 A1 * | 11/2015 | Okano | B60T 8/34 701/70 |
| 2016/0068246 A1 | 3/2016 | Shomura et al. | |

OTHER PUBLICATIONS

Hebert, James, Twin Outboard Engine Installation on Moderate V-hull Boats, webpage article for continuousWave, May 27, 2006, webpage available at http://continuouswave.com/whaler/reference/twinEngineMounting.html, last visited on Jul. 16, 2015.

* cited by examiner

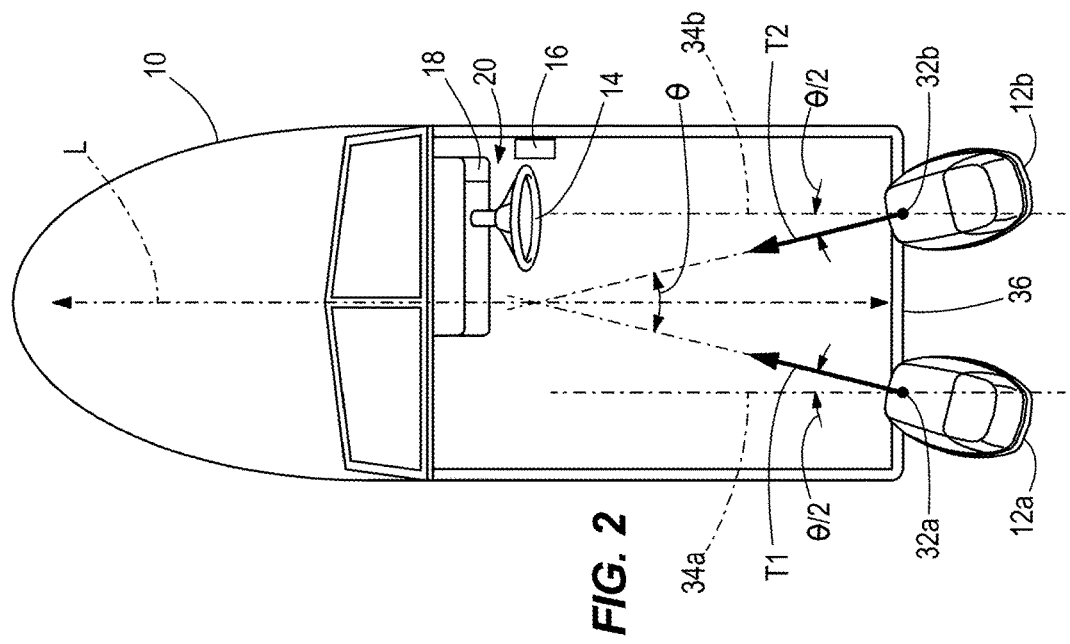
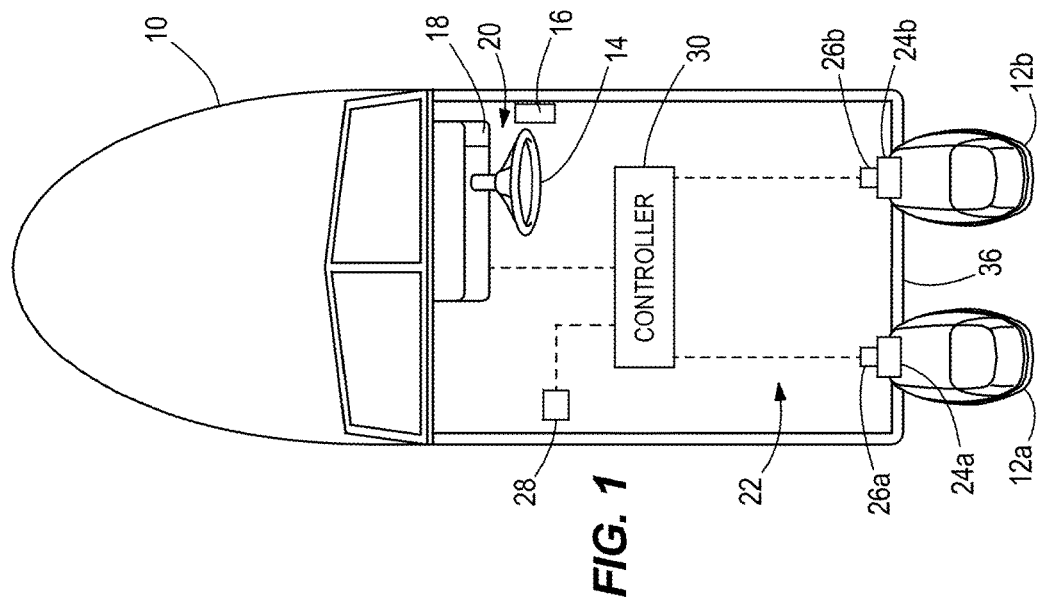

SYSTEMS AND METHODS FOR CONTINUOUSLY ADAPTING A TOE ANGLE BETWEEN MARINE PROPULSION DEVICES

FIELD

The present disclosure relates to systems and methods for using steering actuators to position marine propulsion devices coupled to a marine vessel. More specifically, the present disclosure relates to systems and methods for providing a toe angle between two or more marine propulsion devices.

BACKGROUND

The following U.S. patents and patent applications are hereby incorporated herein by reference.

U.S. Pat. No. 6,821,168 discloses an outboard motor provided with an internally contained cylinder and moveable piston. The piston is caused to move by changes in differential pressure between first and second cavities within the cylinder. By adding a hydraulic pump and a steering valve, the hydraulic steering system described in U.S. Pat. No. 6,402,577 is converted to a power hydraulic steering system by adding a hydraulic pump and a steering valve to a manual hydraulic steering system.

U.S. Pat. No. 7,150,664 discloses a steering actuator system for an outboard motor that connects an actuator member to guide rails, which are, in turn, attached to a motive member such as a hydraulic cylinder. The hydraulic cylinder moves along a first axis with the guide rail extending in a direction perpendicular to the first axis. An actuator member is movable along the guide rail in a direction parallel to a second axis and perpendicular to the first axis. The actuator member is attached to a steering arm of the outboard motor.

U.S. Pat. No. 7,255,616 discloses a steering system for a marine propulsion device that eliminates the need for two support pins and provides a hydraulic cylinder with a protuberance and an opening which cooperate with each other to allow a hydraulic cylinder's system to be supported by a single pin for rotation about a pivot axis. The single pin allows the hydraulic cylinder to be supported by an inner transom plate in a manner that it allows it to rotate in conformance with movement of a steering arm of a marine propulsion device.

U.S. Pat. No. 7,467,595 discloses a method for controlling the movement of a marine vessel including rotating one of a pair of marine propulsion devices and controlling the thrust magnitudes of two marine propulsion devices. A joystick is provided to allow the operator of the marine vessel to select port-starboard, forward-reverse, and rotational direction commands that are interpreted by a controller which then changes the angular position of at least one of a pair of marine propulsion devices relative to its steering axis.

U.S. Pat. No. 8,046,122 discloses a control system for a hydraulic steering cylinder utilizing a supply valve and a drain valve. The supply valve is configured to supply pressurized hydraulic fluid from a pump to either of two cavities defined by the position of a piston within the hydraulic cylinder. A drain valve is configured to control the flow of hydraulic fluid away from the cavities within the hydraulic cylinder. The supply valve and the drain valve are both proportional valves in a preferred embodiment of the disclosed invention in order to allow accurate and controlled movement of a steering device in response to movement of a steering wheel of a marine vessel.

U.S. Pat. No. 8,512,085 discloses a tie bar apparatus for a marine vessel having at least first and second marine drives. The tie bar apparatus comprises a linkage that is geometrically configured to connect the first and second marine drives together so that during turning movements of the marine vessel, the first and second marine drives steer about respective first and second vertical steering axes at different angles, respectively.

Unpublished U.S. patent application Ser. No. 14/177,762, filed Feb. 11, 2014, discloses a system for controlling movement of a plurality of drive units on a marine vessel having a control circuit communicatively connected to each drive unit. When the marine vessel is turning, the control circuit defines one of the drive units as an inner drive unit and another of the drive units as an outer drive unit. The control circuit calculates an inner drive unit steering angle and an outer drive unit steering angle and sends control signals to actuate the inner and outer drive units to the inner and outer drive unit steering angles, respectively, so as to cause each of the inner and outer drive units to incur substantially the same hydrodynamic load while the marine vessel is turning. An absolute value of the outer drive unit steering angle is less than an absolute value of the inner drive unit steering angle.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In one example of the present disclosure, a system for reducing steering pressures of two or more steering actuators positioning two or more respective marine propulsion devices coupled to a marine vessel is disclosed. A first sensor senses a first condition indicative of a first pressure in a first steering actuator positioning a first marine propulsion device, and a second sensor senses a second condition indicative of a second pressure in a second steering actuator positioning a second marine propulsion device. A third sensor senses an operating characteristic of the marine vessel. A controller is in signal communication with the first, second, and third sensors. In response to the marine vessel travelling generally straight ahead, the controller determines a target toe angle between the first and second marine propulsion devices based on the operating characteristic. The controller commands the first and second steering actuators to position the first and second marine propulsion devices at the target toe angle. The controller thereafter gradually adapts the target toe angle between the first and second marine propulsion devices until the controller determines that an absolute difference between the first pressure and the second pressure reaches a calibrated value.

According to another example of the present disclosure, a method for reducing steering pressures of two or more steering actuators positioning two or more respective marine propulsion devices coupled to a marine vessel is disclosed. The method includes sensing a first condition indicative of a first pressure in a first steering actuator positioning a first marine propulsion device, sensing a second condition indicative of a second pressure in a second steering actuator positioning a second marine propulsion device, and sensing an operating characteristic of the marine vessel. The method also includes determining with a controller whether the marine vessel is travelling generally straight ahead. If so, the method includes determining a target toe angle between the first and second marine propulsion devices based on the operating characteristic; commanding the first and second steering actuators to position the first and second marine propulsion devices at the target toe angle; and, with the controller, gradually adapting the target toe angle between the first and second marine propulsion devices until determining that an absolute difference between the first pressure and the second pressure reaches a calibrated value.

BRIEF DESCRIPTION OF THE DRAWINGS

The present disclosure is described with reference to the following Figures. The same numbers are used throughout the Figures to reference like features and like components.

FIG. 1 illustrates one example of a marine vessel having two marine propulsion devices coupled to a transom thereof.

FIG. 2 illustrates the marine vessel with the marine propulsion devices positioned in one example of a "toe-in" configuration.

DETAILED DESCRIPTION

Figure 3:
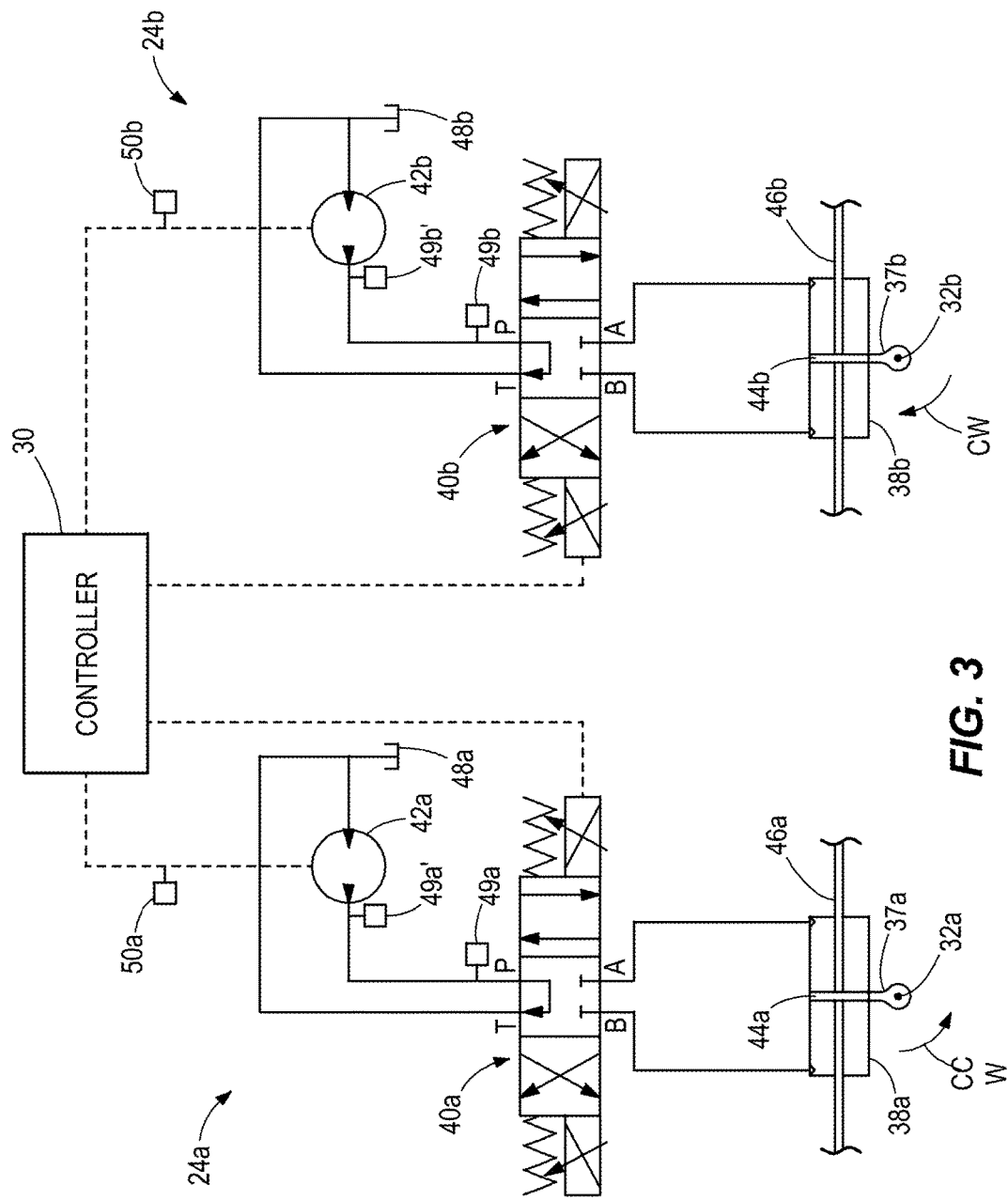
FIG. 3 illustrates a schematic hydraulic diagram of two steering actuators.

In the present description, certain terms have been used for brevity, clarity and understanding. No unnecessary limitations are to be inferred therefrom beyond the requirement of the prior art because such terms are used for descriptive purposes only and are intended to be broadly construed.

FIG. 1 illustrates a marine vessel 10 having two marine propulsion devices 12a, 12b coupled thereto for propelling the marine vessel 10. In the example shown, the marine propulsion devices 12a, 12b are outboard motors coupled to the transom 36; however, the marine propulsion devices 12a, 12b could be any type of steerable marine propulsion device, such as but not limited to a stern drive. The marine propulsion devices 12a, 12b may operate in many different modes, including but not limited to a joysticking mode, as described in U.S. Pat. No. 7,467,595, incorporated by reference herein above. While in joysticking mode, a steer-by-wire system may orient the marine propulsion devices 12a, 12b independently of one another and to different steering angles about their steering axes 32a, 32b (see FIG. 2) in response to manipulation of a device at the helm 20, such as a steering wheel 14 or a joystick 16. The marine propulsion devices 12a, 12b may also be automatically independently steered about their steering axes 32a, 32b according to commands from an autopilot system 18. In order to allow such independent steering of the marine propulsion devices 12a, 12b, the marine propulsion devices 12a, 12b are not connected by a tie bar, as is common with propulsion devices (especially outboard motors) when more than one drive unit is provided. A tie bar traditionally distributes steering loads between multiple marine propulsion devices. Such load distribution is absent upon removal of the tie bar in order to allow for independent rotation of the marine propulsion devices 12a, 12b about their steering axes 32a, 32b.

While the vessel 10 is underway, hydrodynamic forces on the propulsion devices 12a, 12b are caused both by the propellers of the propulsion devices themselves as they push against the water, and by water moving off the hull of the vessel 10 and subsequently hitting each propulsion device. Unbalanced propeller torque on a single-propeller drive and force from water coming off the hull result in very high individual counteracting forces being required from the steering systems to steer and maintain the marine propulsion devices 12a, 12b at desired steering angles. The high pressures can overwhelm the steering systems, which may cause the marine vessel to become unresponsive to steering requests and may further cause steering diagnostic errors. Through research and development, the present inventors recognized that if such hydrodynamic forces can be decreased, this would reduce inefficiencies in the steering systems and prevent possible diagnostic faults due to failure of the steering actuators to achieve required counteracting steering forces.

Applicant's co-pending application Ser. No. 14/177,762, filed Feb. 11, 2014, and titled "Systems and Methods for Controlling Movement of Drive Units on a Marine Vessel," which was incorporated by reference herein above, discusses how marine propulsion devices, especially when provided in a pair, triple, or quad configuration, can be steered to different steering angles from one another so as to cause each of the propulsion devices to incur substantially the same hydrodynamic load while the marine vessel is turning. The '762 application does not, however, address a situation in which the marine vessel is traveling generally straight ahead. Current solutions for reducing steering loads while a vessel is travelling straight ahead include calibrating an open-loop system whereby pressure sensors are temporarily added to the steering system to help determine a beneficial toe angle (see for example toe angle θ, FIG. 2) for the marine propulsion devices 12a, 12b as a function of boat speed, with the objective of minimizing steering pressure. However, such a calibration solution does not take into account disturbances to the system such as changing trim angles, asymmetric boat loads, crosswinds, crosscurrents, propellers other than those used during calibration being swapped in, etc. Further, the open-loop system needs to be calibrated on a per-vessel basis. This adds time and complexity to the setup of any vessel's system. The present inventors realized that by adding a permanent sensor to each propulsion device's steering system, certain conditions (such as but not limited to pressures and/or currents) of the steering systems can be constantly monitored. This pressure and/or current feedback, which is indicative of a pressure in each steering system, can then be used as part of a closed-loop feedback control algorithm to adjust the toe angle to one where hydrodynamic forces on the propulsion devices are reduced. For example, the pressure and/or current feedback can be used to gradually adjust (i.e., adapt) the toe angle between the marine propulsion devices until an absolute difference between pressures in the first and second steering actuators reaches a calibrated value, as will be described further herein below.

For example, referring still to FIG. 1, a system 22 for reducing steering pressures of two or more steering actuators 24a, 24b positioning the two or more respective marine propulsion devices 12a, 12b on the marine vessel 10 may include a first sensor 26a sensing a first condition indicative of a pressure in the first steering actuator 24a that positions the first marine propulsion device 12a. The system 22 may also include a second sensor 26b sensing a second condition indicative of a pressure in a second steering actuator 24b that positions the second marine propulsion device 12b. A third sensor 28 may also be provided for sensing an operational characteristic of the marine vessel 10. A controller 30 may be provided in signal communication with the first, second, and third sensors 26a, 26b, 28. The controller 30 is also communicatively connected with the input devices at the helm 20, including the steering wheel 14, the joystick 16, and the autopilot system 18.

The controller 30 may include a computing system that includes a processing system, storage system, software, and input/output (I/O) interfaces for communicating with the helm input devices 14, 16, 18, sensors 26a, 26b, 28, steering actuators 24a, 24b, and propulsion devices 12a, 12b. The processing system loads and executes software from the storage system, including a toe angle adaptation software application module. When executed by the computing system, the toe angle adaptation software application module directs the processing system to operate as described herein below in further detail to execute the toe angle adaptation method.

The computing system may include one or many application modules and one or more processors, which may be communicatively connected. The processing system can comprise a microprocessor and other circuitry that retrieves and executes software from the storage system. Processing system can be implemented within a single processing device but can also be distributed across multiple processing devices or sub-systems that cooperate in existing program instructions. Non-limiting examples of the processing system include general purpose central processing units, applications specific processors, and logic devices.

The storage system can comprise any storage media readable by the processing system and capable of storing software. The storage system can include volatile and non-volatile, removable and non-removable media implemented in any method or technology for storage of information, such as computer readable instructions, data structures, program modules, or other data. The storage system can be implemented as a single storage device or across multiple storage devices or sub-systems. The storage system can further include additional elements, such as a controller capable of communicating with the processing system. Non-limiting examples of storage media include random access memory, read only memory, magnetic discs, optical discs, flash memory, virtual memory, and non-virtual memory, magnetic sets, magnetic tape, magnetic disc storage or other magnetic storage devices, or any other medium which can be used to store the desired information and that may be accessed by an instruction execution system. The storage media can be a non-transitory or a transitory storage media.

Besides including the helm input devices 14, 16, 18, other user interfaces could alternatively or additionally include a mouse, a keyboard, a voice input device, a touch input device (e.g., touch screen), and other comparable input devices and associated processing elements capable of receiving user input from an operator of the marine vessel 10. Output devices such as a video display or graphical display can display an interface further associated with embodiments of the system and method disclosed herein.

Now turning to FIG. 2, the concept of "toe angle" will be more fully described. FIG. 2 illustrates a center line L of the marine vessel 10 that divides the marine vessel 10 into two lateral halves. The first marine propulsion device 12a is a port marine propulsion device and rotates about a generally vertical steering axis 32a, while the second marine propulsion device 12b is a starboard marine propulsion device and rotates about a generally vertical steering axis 32b. The steering axes 32a, 32b are oriented vertically along respective steering columns of the marine propulsion devices 12a, 12b as is known, and are spaced generally equally from the center line L of the marine vessel 10. Each of the marine propulsion devices 12a, 12b is capable of being steered to a neutral steering position, see FIG. 1, in which the marine propulsion devices 12a, 12b have thrusts that are aligned parallel to the centerline L. For example, the thrusts may be oriented along parallel lines 34a, 34b shown in FIG. 2.

In FIG. 2, however, the thrusts T1, T2 of the first and second marine propulsion devices 12a, 12b are not oriented along the lines 34a, 34b. Instead, the marine propulsion devices 12a, 12b are each rotated such that their foremost ends are turned towards the center line L of the marine vessel 10, in a "toe-in" orientation. The marine propulsion devices 12a, 12b are here oriented at a particular toe angle labeled θ. The thrust T1, T2 of each marine propulsion device 12a, 12b is thus oriented at an angle of θ/2 from the center line L of the marine vessel 10, and by virtue of geometrical principles, at θ/2 from respective line 34a or 34b. As known to those having ordinary skill in the art, the marine propulsion devices 12a, 12b can also be positioned in a "toe-out" orientation, in which their aft-most ends are rotated toward the center line L of the marine vessel 10. In this case, the marine propulsion devices 12a, 12b would be rotated about their steering axes 32a, 32b in opposite directions with respect to the parallel lines 34a, 34b than those shown in FIG. 2.

The angles of the marine propulsion devices 12a, 12b around their steering axes 32a, 32b and the orientations of the thrusts T1, T2 are exaggerated in FIG. 2 for purposes of illustration, and in reality toe-in and toe-out orientations generally require that the propulsion devices be rotated from about 0-10 degrees from parallel. Additionally, it should be understood that the marine vessel 10 is propelled in a generally straight ahead direction despite angling of the marine propulsion devices 12a, 12b about their steering axis 32a, 32b to achieve a given toe angle. Any sideways thrust from one propulsion device is cancelled by sideways thrust from the other, resulting in additive forward thrust.

The precise toe angle θ at which the marine propulsion devices 12a, 12b are oriented from one another may be determined and set in different ways. As described herein above, in prior art systems, the toe angle θ is a pre-calibrated value that is determined by test driving the marine vessel 10 and determining at what tested toe angle the pressures in the steering systems are optimal. However, such a system does not allow for real-time, on-the-fly adaptation of the toe angle to the particular conditions encountered by the marine vessel 10 while it is underway. Therefore, in other examples, a toe angle map (e.g., chart, graph, lookup table, etc.) can be stored in a memory of the controller 30. The map can output a particular toe angle θ based on an input of vessel speed, pseudo boat speed from a GPS, engine speed in RPM, etc. Other inputs such as trim angle of the marine propulsion devices 12a, 12b may be used as second ordinates in the toe angle map. However, even when using a toe angle map, a toe angle value determined based on only one or two operating conditions will not result in optimal performance of the steering system because other operating conditions of the marine vessel 10 will likely vary, which other operating conditions were not taken into account when determining the toe angle value from the map. For example, for different propulsion device trim angles, vessel speeds, engine speeds, etc., there will be different optimal toe angles for varying conditions such as vessel loading, crosswinds, or crosscurrents. A map that took into account each of these inputs would require complex programming and/or calibration. Thus, setting a toe angle based on merely one or two measured conditions is not optimal for responding to a multitude of other dynamic conditions the vessel may encounter while underway.

One way to determine in real-time whether a toe angle is optimal for particular dynamic operating conditions of the marine vessel 10 is to determine the magnitude and direction of the steering pressures in the steering systems. These pressures provide indications of how hard the steering systems are working to maintain orientations of the marine propulsion devices 12a, 12b about their steering axes 32a, 32b at the angles θ/2 from parallel in order to maintain the overall commanded toe angle θ determined by the controller 30. As mentioned above, the present inventors have realized that by continually measuring the pressure in each propulsion device's steering system, they can gradually adapt the toe angle to one that would reduce the load on the steering system until it is no more than a calibrated amount.

Such a adaptation is best accomplished when the marine vessel 10 is travelling generally straight ahead because this is when changing the toe angle will have the most effect on reducing steering pressures. (Compare a situation in which the marine vessel 10 is turning, when the steering pressures should be relatively high in order to rotate the propulsion devices to angles that will accomplish the turn.) For example, the controller 30 may adapt the target toe angle only when a desired turning angle of the marine vessel is within a given deadband of zero. An input device such as the steering wheel 14, joystick 16, or autopilot system 18 could provide the desired turning angle of the marine vessel 10 to the controller 30. In one example, if the desired turning angle of the marine vessel 10 is five degrees or less, the controller 30 may determine that the marine vessel 10 is traveling generally straight ahead, and may carry out the adaptation algorithm. In another example, an actual change in heading of the marine vessel 10 may be measured to determine if the vessel is turning in one direction or the other inside or outside of the deadband.

According to the toe angle adaptation software saved on the storage system and executed by the processing system, in response to a determination that the marine vessel 10 is traveling generally straight ahead, the controller 30 determines a target toe angle between the first and second marine propulsion devices 12a, 12b based on the operating characteristic determined by the third sensor 28. In one example, the third sensor 28 is a vessel speed sensor that senses the speed of the marine vessel 10, and the controller 30 may determine the target toe angle θ based on the sensed vessel speed, such as for example by using a toe angle map as described herein above. In other examples, the third sensor 28 senses speeds of the engines of the marine propulsion devices 12a, 12b and uses engine RPM to determine the target toe angle θ. In another example, the sensor 28 includes two or more sensors, and the method includes determining the target toe angle θ with the controller 30 based on at least two operating characteristics of the marine vessel 10. For example, the toe angle map used by the controller 30 can be ordinated against both vessel speed and trim angle, or against any two vessel operating conditions that affect responses of the steering system as it attempts to maintain a particular commanded toe angle.

Once the controller 30 has determined the target toe angle θ, the controller 30 then commands the first and second steering actuators 24a, 24b to position the first and second marine propulsion devices 12a, 12b at the target toe angle θ, with each propulsion device oriented at θ/2 from parallel.

This target toe angle θ is, however, only an initial toe angle, because as mentioned above, the controller 30 thereafter gradually adapts the target toe angle between the first and second marine propulsion devices 12a, 12b. The controller 30 does so until the controller 30 determines that an absolute difference between the first and second pressures reaches a calibrated value. It is not necessary to bring the absolute difference between the steering pressures to zero (i.e., to a point where the pressure in steering actuator 24a is equal in magnitude and opposite in direction to the pressure in steering actuator 24b). Rather, the calibrated value may be a non-zero pressure value that ensures good handling of the vessel 10. It may be a single, unchanging value, or it may be determined from calibrations that relate ideal pressure differentials for good handling of the vessel 10 to different vessel speeds, turning angles, and/or trim angles. In one example, the calibrated value is 200 PSI. In other examples, an exact pressure value does not have to be achieved, but reaching any value within a given range will suffice to temporarily end the adaptation process. For instance, the calibrated value could be a high end of a range of values that are acceptable for desired handling of the vessel 10.

Before describing the process of adapting the toe angle to one where the absolute difference in steering pressures reaches the calibrated value, FIG. 3 will be used to more fully describe the steering system associated with each marine propulsion device 12a, 12b and what sensed conditions are indicative of steering pressures. As shown in FIG. 3, each steering actuator 24a, 24b is a hydraulic actuator and respectively includes a hydraulic cylinder 38a, 38b coupled via a control valve 40a, 40b to a pump-motor combination 42a, 42b. The hydraulic cylinders 38a, 38b are provided with pistons 44a, 44b therein, which are connected to piston rods 46a, 46b. Depending on the design of the steering actuator 24a or 24b, as hydraulic fluid is provided to one side or the other of the piston 44a or 44b within the cylinder 38a or 38b, either the cylinder 38a or 38b will move with respect to the stationary piston 44a or 44b, or the piston 44a or 44b will move with respect to the stationary cylinder 38a or 38b. It should be noted that the precise hydraulic cylinder and piston/piston rod combination that is used is not limiting on the scope of the present disclosure.

For purposes of the examples provided herein, the pistons 44a, 44b and piston rods 46a, 46b are the moveable components, and the cylinders 38a, 38b are the stationary components. Thus, the pistons 44a, 44b are respectively coupled to steering arms 37a, 37b of the propulsion devices 12a, 12b, and the cylinders 38a, 38b are respectively coupled to the marine vessel 10 such as by way of transom brackets. As known to those having ordinary skill in the art, and as described in U.S. Pat. No. 6,821,168 incorporated herein above, as the pistons 44a, 44b move back and forth in the cylinders 38a, 38b, the steering arms 37a, 37b rotate around the steering axes 32a, 32b and the marine propulsion devices 12a, 12b therefore also rotate about the steering axes 32a, 32b. Hydraulic steering fluid is provided to the cylinders 38a, 38b from tanks 48a, 48b via the pump-motor combinations 42a, 42b. To and from which side of the pistons 44a, 44b the fluid is provided or removed depends on the position of the control valves 40a, 40b. In the example shown herein, the control valves 40a, 40 are electrically actuated directional control valves. The controller 30 dictates the direction of current that will be provided to each control valve 40a, 40b and therefore controls the direction of fluid flow through the control valves 40a, 40b to either side of the pistons 44a, 44b.

For purposes of example only, the following conventions regarding positive and negative currents, pressures, and rotation will be used, it being understood that this notation may vary if the system is set up differently or if a system programmer chooses different nomenclature. As an example, when negative current is provided to the control valve 40a, the control valve 40a is shifted to the left, and fluid is provided from the pump-motor combination 42a through the P port to the A port and to the right hand side of the piston 44a. At the same time, fluid is drained from the left hand side of the piston 44a through the B port and T port and resupplied to the tank 48a. This will be referred to as positive steering pressure, which causes the piston 44a to tend to want to move to the left in the cylinder 38a. If counteracting hydrodynamic forces on the propulsion device 12a are not great enough to overcome the positive steering pressure, the steering arm 37a will rotate counterclockwise, as shown by the arrow CCW. On the other hand, if the control valve 40b is provided with positive current, the control valve 40b shifts to the right, and fluid is pumped through the P port and the B port to the left hand side of the piston 44b. At the same time, fluid is drained from the right hand side of the piston 44b via the A port and T port back to tank 48b. This will be referred to as negative steering pressure, which causes the piston 44b to tend to want to move to the right in the cylinder 38b. If counteracting hydrodynamic forces on the propulsion device 12b are not great enough to overcome the negative steering pressure, the steering arm 37b will rotate clockwise, as shown by the arrow CW.

For a moment assume that the system and method of the present disclosure are not provided and the commanded toe angle is 0° and the propulsion devices are steered straight ahead. If hydrodynamic forces are acting on the inner, facing surfaces of the propulsion devices, tending to push their aft-most ends away from the center line L of the vessel 10, the pump-motor combinations 42a, 42b will work to supply steering pressures that are great enough to counteract these hydrodynamic forces and maintain the propulsion devices in their straight-ahead orientations. The control valves 40a, 40b will be shifted to the left and right respectively, as in the above example, to provide hydraulic pressure that will cause the propulsion devices to resist the external hydrodynamic forces. In other words, if the external hydrodynamic force is tending to rotate the port propulsion device 12a in a clockwise direction, the steering actuator 24a will provide an opposing steering pressure that tends to rotate the port device 12a in the counterclockwise direction, and vice versa for the starboard propulsion device 12b. The commanded 0° toe angle will thus be maintained. However, the high pressures required from the steering actuators 24a, 24b to resist the external hydrodynamic forces may leave very little room for pressure increases to accomplish a turn, and may lead to diagnostic errors. This can be rectified by reducing the steering pressures, such as by changing the toe angle to one that does not require as much counteracting steering pressure to maintain. For example, the toe angle can be adapted to one at which the propulsion devices are aligned more parallel to the external hydrodynamic forces rather than aligned relatively more cross-wise to them.

In order to determine in what direction the propulsion devices should be rotated, and when such rotation is necessary, the controller 30 uses measurements of both the magnitude and direction of pressure in the steering actuators 24a, 24b. The magnitude and direction of pressures together can be used to calculate an absolute difference between the pressure in the first steering actuator 24a and the pressure in the second steering actuator 24b. The absolute difference can be used to determine if it is necessary to change the toe angle, and the direction of pressures can be used to determine whether the toe angle should be increased or decreased. According to the convention used herein, increasing the toe angle corresponds to moving the propulsion devices such that their aft-most ends move away from one another, and decreasing the toe angle corresponds to moving the propulsion devices such that their aft-most ends move toward one another. In one example, the controller 30 may determine first and second directions of pressure in the respective first and second steering actuators 24a, 24b, and based on the first and second directions of pressure, may determine whether the target toe angle θ should be adaptively increased or adaptively decreased.

According to the above-noted conventions, if the port steering actuator 24a has positive pressure, and the starboard steering actuator 24b has negative pressure, then the controller 30 will determine that the steering actuators 24a, 24b are fighting to keep the marine propulsion devices 12a, 12b in a given configuration despite external hydrodynamic forces tending to push their aft-most ends away from one another. If an absolute difference between the pressures in the steering actuators 24a, 24b is unacceptably high (i.e., greater than the above-noted calibrated value), the controller 30 will command the steering actuators 24a, 24b to increase the toe angle θ so that the propulsion devices 12a, 12b are more aligned with the external hydrodynamic forces. On the other hand, if the port steering actuator 24a has negative pressure and the starboard steering actuator 24b has a positive pressure, then the controller 30 will determine that the steering actuators 24a, 24b are fighting to keep the marine propulsion devices in a given configuration despite external hydrodynamic forces tending to push their aft-most ends together, and will decrease the toe angle so that the propulsion devices 12a, 12b are more aligned with the external hydrodynamic forces. However, if the controller 30 senses that both the port and starboard steering actuators 24a, 24b have negative pressures or both have positive pressures, then the controller 30 will not carry out the adaptation algorithm. In such cases the marine vessel 10 is either not travelling generally straight ahead, or there is a crosswind or crosscurrent affecting the steering pressures.

Because the steering actuators' pressures are defined as positive or negative based on the positions of the control valves 40a, 40b, the controller 30 can determine the first and second directions of pressure in the respective first and second steering actuators 24a, 24b based on the signs (positive or negative) of the first and second currents provided to the respective first and second control valves 40a, 40b. The signs of the currents can be determined by reading the values of the currents provided to the control valves 40a, 40b as commanded by the controller 30, or can be determined using current sensors such as, for example, ammeters.

In order to determine the absolute difference between the steering pressures, the controller 30 needs to know both the magnitude and direction of the steering pressures. There are multiple ways to determine the magnitudes of pressures in the first and second steering actuators 24a, 24b. In one example, referring back to FIG. 1, the first and second sensors 26a, 26b are pressure sensors, while in another example, the first and second sensors 26a, 26b are current sensors. Referring again to FIG. 3, first and second pressure sensors 49a, 49b provided near the inlet port P of each control valve 40a, 40b sense first and second pressures in the respective first and second steering actuators 24a, 24b. The pressure sensors could alternatively be provided at the outlets of the pump-motor combinations 42a, 42b, as shown at 49a', 49b'. In another example, current sensors 50a, 50b sense first and second currents provided to the respective first and second pump-motor combinations 42a, 42b. The controller 30 determines the first and second pressures in the respective first and second steering actuators 24a, 24b based on signals from the first and second current sensors 50a, 50b rather than directly from pressure sensors such as 49a, 49b or 49a', 49b'. For example, the controller 30 may be programmed to use values of current drawn by each pump-motor combination 42a, 42b, along with specifications of the pump-motors such as their efficiency, to approximate their pressure outputs to the hydraulic cylinders 38a, 38b. In yet another example, the system may be provided with directional pressure sensors that sense both a direction and a magnitude of pressure provided to the hydraulic cylinders 38a, 38b and provide this information to the controller 30.

Once the controller 30 has the magnitude and direction of the steering actuators' pressures, the controller 30 can calculate the absolute difference between the pressure in the first steering actuator 24a and the pressure in the second steering actuator 24b. For example, if the pressure in the first steering actuator is +1000 PSI and the pressure in the second steering actuator is −500 PSI, the absolute difference is 1500 PSI. The controller 30 then compares the absolute pressure difference to the calibrated value (e.g. 200 PSI) and adjusts the toe angle as needed, for example in stepwise increments, until the controller determines that the calibrated value is reached.

Figure 4:
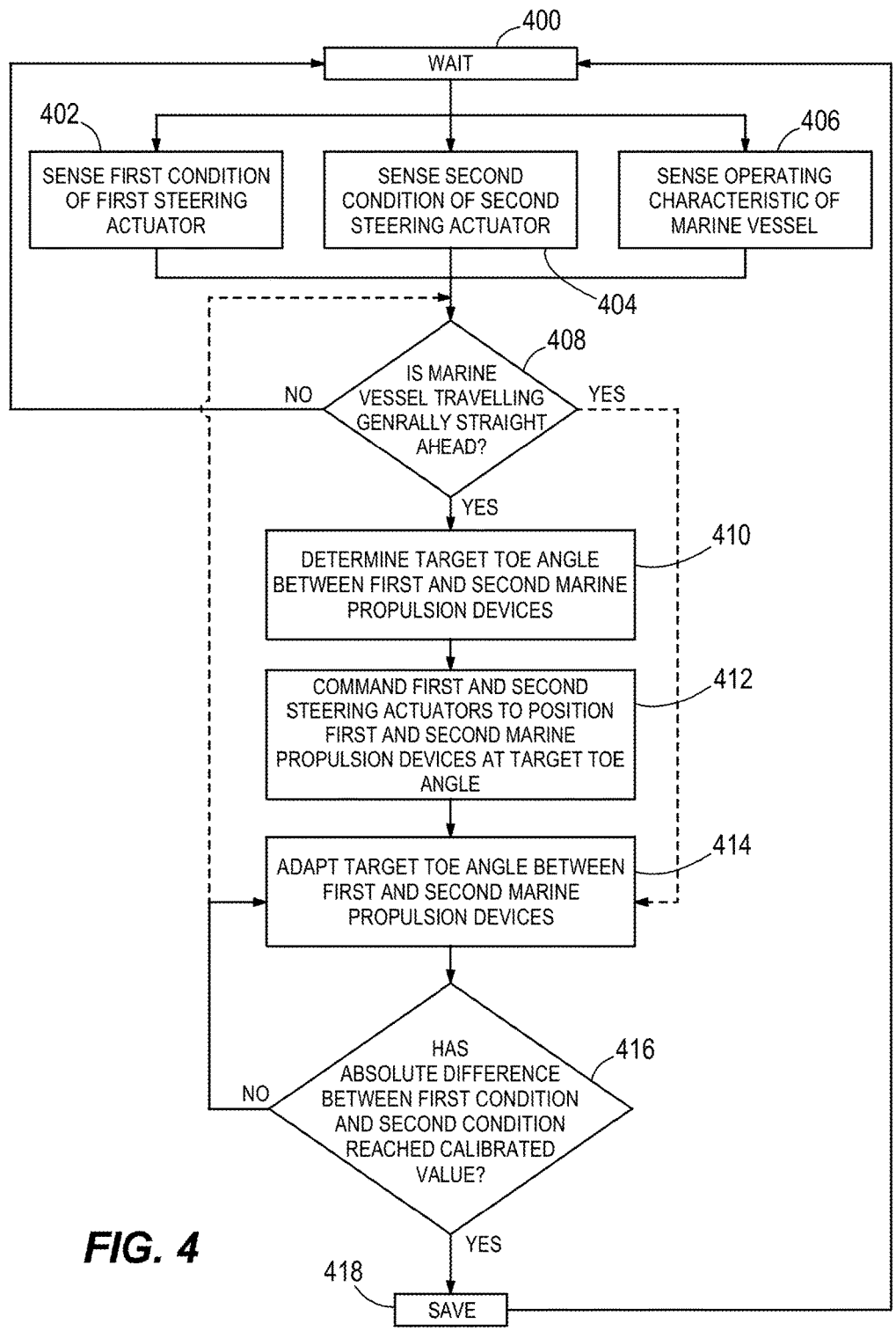
FIG. 4 illustrates one example of a method for reducing steering pressures of two or more steering actuators according to the present disclosure.

Turning to FIG. 4, examples of methods that the controller 30 carries out to adjust the toe angle until reaching the calibrated absolute pressure differential value will be more fully described. The method begins in a wait condition, as shown at 400, during which the controller 30 determines or retrieves the calibrated value with which to compare the absolute pressure difference between the two steering systems.

As shown at 402, the method includes sensing a first condition that is indicative of a pressure in a first steering actuator 24a, such as with a first sensor 26a. As shown at 404, the method also includes sensing a second condition indicative of a second pressure in a second steering actuator 24b, such as with a second sensor 26b. As discussed, the first and second sensors may be pressure sensors 49a, 49b that sense pressures produced by the pump-motor combinations 42a, 42b or current sensors 50a, 50b that sense currents provided to the pump-motor combinations 42a, 42b. As shown at 406, the method may also include sensing an operating characteristic of the marine vessel 10, such as with third sensor 28.

Either before, after, or while the conditions are sensed at boxes 402, 404, and 406, the method includes, as shown at 408, determining whether the marine vessel 10 is traveling generally straight ahead. As indicated herein above, in one example this may include determining whether an input device, such as the steering wheel 14, joystick 16, or autopilot system 18 is commanding a desired turning angle that is within a given deadband of zero. If not, the method will return to wait at 400. In other words, the controller 30 does not determine a target toe angle or adapt the target toe angle if the controller determines that the marine vessel 10 is not traveling generally straight ahead.

However, if at 408 the controller 30 determines that the marine vessel 10 is traveling generally straight ahead, the method continues to 410, and includes determining a target toe angle between the first and second marine propulsion devices 12a, 12b. As indicated herein above, this can be done using a toe angle map that relates a particular operating characteristic of the marine vessel 10, such as one sensed by the third sensor 28, to a toe angle θ. Next, as shown at 412, the method includes commanding the first and second steering actuators 24a, 24b to position the first and second marine propulsion devices 12a, 12b at the target toe angle θ. To achieve the target toe angle, the controller 30 will send signals to the directional control valves 40a, 40b and the pump-motor combinations 42a, 42b to pump hydraulic steering fluid to the hydraulic cylinders 38a, 38b on one side or the other of the pistons 44a, 44b and to drain it from the opposite sides of the pistons 44a, 44b, as described with respect to FIG. 3.

The method next includes adapting the target toe angle between the first and second marine propulsion devices 12a, 12b, as shown at 414. The controller 30 gradually changes the actual toe angle between the marine propulsion devices 12a, 12b based on the sensed conditions indicative of magnitudes and directions of the first and second pressures in the steering actuators 24a, 24b as described above with respect to FIG. 3. In one example, a rate at which the controller 30 adapts the target toe angle varies directly proportionally with the absolute difference between the first and second pressures. For example, if one of the steering pressures is very high and the other of the steering pressures is very low, the controller 30 will adapt the target toe angle more quickly than if the pressures have a lesser absolute difference between them. The given amount by which the controller 30 changes the toe angle before re-reading the first and second conditions may thus be greater when the absolute difference between the first and second pressures is large than when the absolute difference between the first and second pressures is relatively small. The controller 30 may use an adaptive algorithm that changes a gain based on a remaining value between the actual absolute pressure difference and the calibrated absolute pressure difference.

As shown at 416, the method next includes determining with the controller 30 whether the absolute difference between the first pressure and the second pressure has reached the calibrated value. To do so, the controller 30 re-reads the first and second operating conditions (again, which can be pressures in the steering actuators 24a, 24b or currents provided to the pump-motor combination 42a, 42bs). As noted above, the pressures could be measured directly using pressure sensors 49a, 49b, or could instead be determined by measuring the currents provided to the pump-motor combinations 42a, 42b using current sensors 50a, 50b. If the answer at 416 is no, the method may return to 414, where the controller 30 again adapts the actual toe angle by a given amount, and again re-reads the first and second conditions to determine at 416 whether the absolute difference between the first and second pressures has reached the calibrated value. Alternatively, if the answer at 416 is no, the method may return to 408 as shown by the dashed lines, where the controller 30 again determines whether the marine vessel 10 is traveling generally straight ahead. If no at 408, the method may return again to wait at 400. If yes at 408, the method may continue along the dashed lines directly back to box 414 (skipping boxes 410 and 412). Thus, the toe angle may be continually adapted until the absolute difference between the first pressure and the second pressure reaches the calibrated value.

Once the absolute difference between the first and second pressures has reached the calibrated value as determined at box 416, the method may continue to box 418, and the controller 30 may save the adapted toe angle at which the absolute difference between the first pressure and the second pressure reaches the calibrated value as an updated target toe angle associated with the particular value of the operating characteristic that was measured at 406. In other words, the toe angle map may be altered such that the toe angle associated with the particular value of the operating characteristic that was sensed at box 406 no longer has the value that was previously determined at box 410, but now has a value equal to the updated, adapted toe angle determined at box 416. Because the updated, adapted value is saved, the next time that the algorithm is run, the controller 30 may command the first and second steering actuators 24a, 24b to position the first and second marine propulsion devices 12a, 12b at the updated target toe angle, read from the updated toe angle map, upon sensing the particular value of the operating characteristic. This provides a smart system in which the controller 30 is able to update toe angles that correspond to particular operating conditions, and to remember these toe angles the next time the operating conditions are encountered.

Saving and retrieving the updated, adapted toe angle is optional, and the controller 30 could instead adapt the toe angle in real time each time the system encounters a particular operating characteristic that causes the ideal toe angle to be different than that stored in the map. Either method is helpful, because even if an updated, adapted toe angle is used during a subsequent run of the system, the updated toe angle may itself be further adapted and updated to a new value that works for a new particular operating condition of the marine vessel. For example, if the system is run such that a toe angle is adapted for a particular speed of the marine vessel, but the next time the marine vessel is run at the same speed the propulsion devices have a different trim angle, the updated toe angle may no longer be appropriate for the entire system. The toe angle may need to be further adapted in order to be ideal for both the vessel speed and the trim angle of the marine propulsion devices.

In one example of the present system and method, the toe angle map may be adapted only when certain criteria are met. For example, the controller 30 may first need to determine that the pressures in the steering systems are stable. Additionally, as mentioned above, the desired turning angle may need to be within a given deadband of zero. The vessel speed may also need to be stable and above a given speed, at which given speed external hydrodynamic forces on the steering system are likely to be high enough that it is desirable to change the toe angle to decrease steering system pressures. Other system requirements may need to be met before the toe angle will be adapted than those listed here.

As noted above, the toe angle is adapted for a particular operating condition while the marine vessel 10 is travelling generally straight ahead. After the toe angle has been adapted to an ideal value that causes the absolute difference between the pressures in the steering actuators 24a, 24b to reach the calibrated value, this toe angle may be incorporated into the positions of the marine propulsion devices 12a, 12b even when a turn is subsequently commanded. For instance, when the desired turning angle of the marine vessel 10 is subsequently outside of the deadband (i.e., when the operator is commanding a turn), the steering angles of the marine propulsion devices 12a, 12b around their steering axes 32a, 32b are calculated such that both the angle needed to achieve the desired turn as well as the toe angle are taken into account. For example, whatever the steering angles of the marine propulsion devices 12a, 12b would otherwise be given a particular input from the steering wheel 14, joystick 16, or autopilot system 18, one half of the toe angle θ (i.e., θ/2) may be added to one of the steering angles and one half of the toe angle (θ/2) may be subtracted from the other of the steering angles, depending on the sign convention of steering angles with respect to the steering axes 32a, 32b.

Now turning to FIGS. 5A through 5E, an example is used to illustrate how the toe angle may be adapted based on a particular operating condition of the marine vessel 10. In this example, the sensed operating condition is a trim position of the marine propulsion devices 12a, 12b. Each graph shown in FIGS. 5A through 5E shows a pump pressure in PSI on the vertical axis and a trim position in percent on the horizontal axis. Each left-hand graph shows the port steering system and each right-hand graph shows the starboard steering system. The points plotted on the graphs represent the steering pressure at a particular trim percent. The notation along the left-hand side of the graphs labels the toe angle θ of the marine propulsion devices 12a, 12b at which the pressures were plotted against the trim percents. For example, at toe angle θ=1°, each marine propulsion device is oriented with its foremost end turned toward the center line L of the marine vessel 10, and with its thrust angled at 0.5° from parallel to the center line L. For purposes of the example, it will be assumed that the calibrated absolute difference desired between the pressures in the steering systems is 200 PSI, although as mentioned above other pressures could be used to provide desired handling of the marine vessel 10.

Figure 5A:
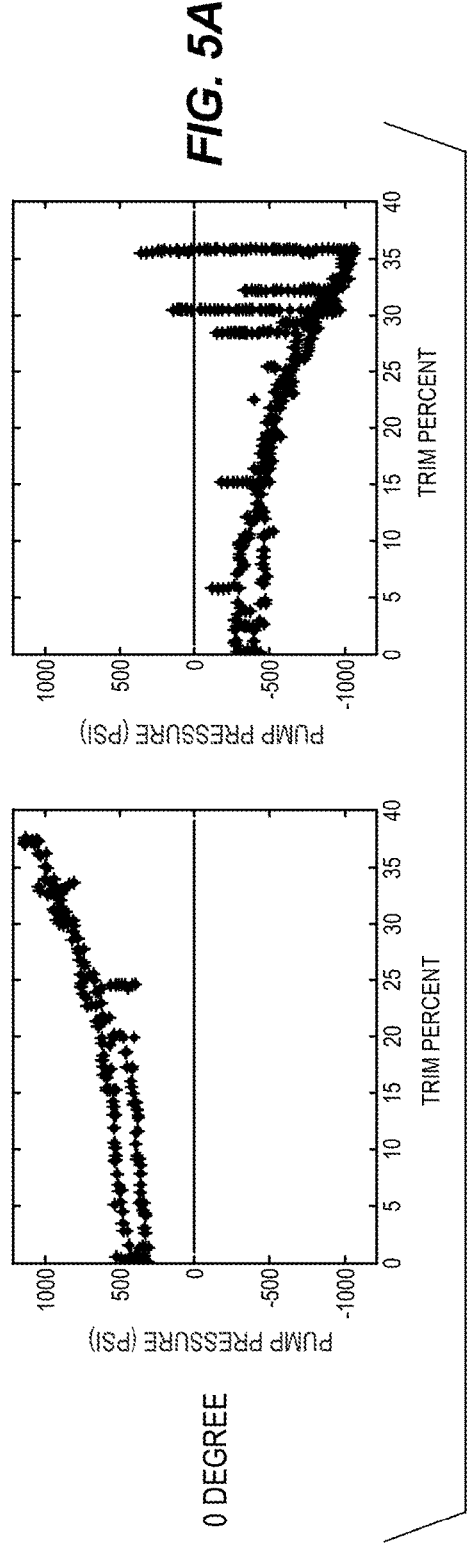
FIGS. 5A-5E are graphs showing the results of carrying out the method described herein with a system as described herein.

It can be seen in FIG. 5A that a zero degree toe angle (i.e., when the marine propulsion devices 12a, 12b have their thrusts T1, T2 oriented along the lines 34a, 34b, see FIG. 2), the magnitudes of the pressures in both the port and starboard steering systems are very high. The port steering system has high positive pressures and the starboard steering system has high negative pressures. As the trim angle nears somewhere between 35 and 40 percent, the absolute difference between the port and starboard steering pressures is over 2000 PSI. (See steering pressure of over +1000 PSI in port steering system at trim angle between 35-40% and steering pressure of less than −1000 PSI in starboard steering system at trim angle between 35-40%.) The controller 30 would thus determine that the 2000 PSI absolute difference is greater than the calibrated 200 PSI value, and would adapt the toe angle. Recalling the discussion herein above with respect to FIG. 3, in this case, the controller 30 would determine that the toe angle needs to be increased, because the port steering system has a very high positive pressure and the starboard steering system has a very high negative pressure.

Figure 5B:
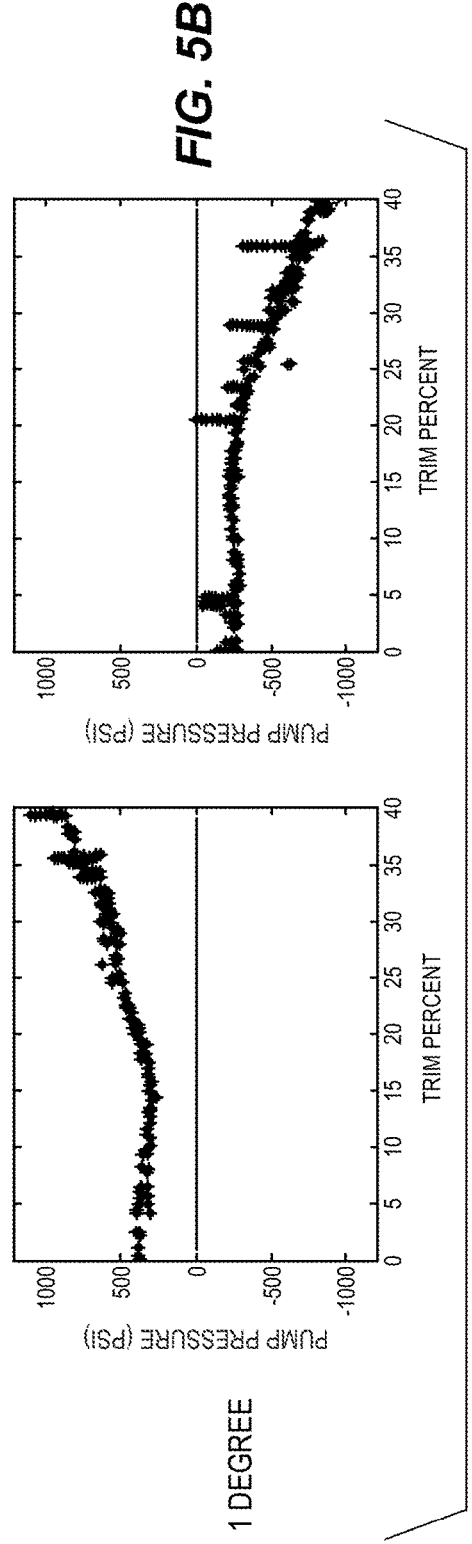

When the toe angle is adaptively increased to 1°, as shown in FIG. 5B, it can be seen that the absolute difference between the steering systems' pressures at between about 35-40% trim has now decreased to about 1800 PSI. The controller 30 would determine that more adaptation of the toe angle is needed because this value is still above the calibrated value of 200 PSI.

Figure 5C:
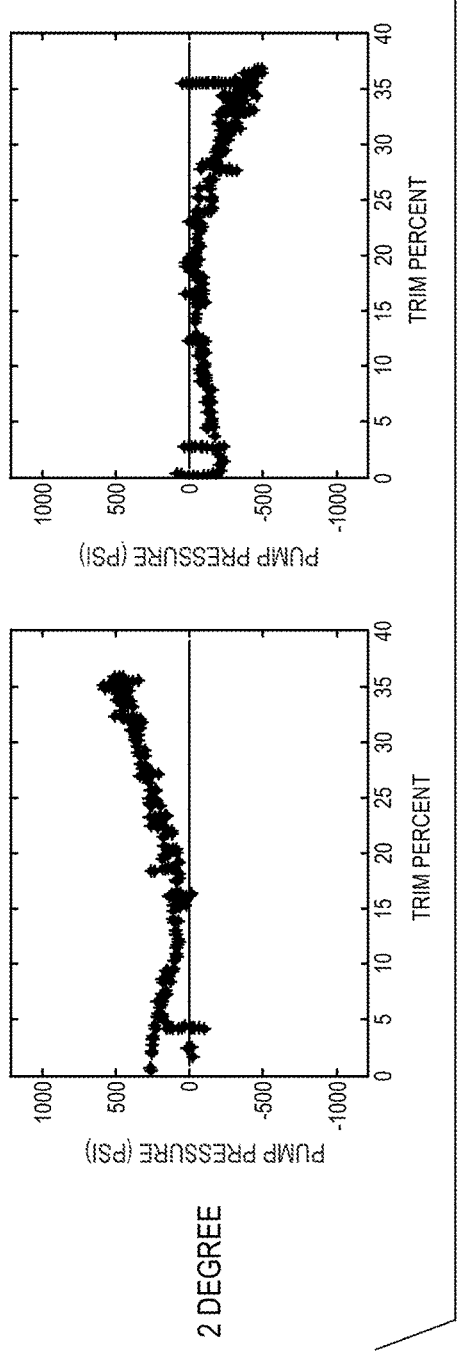

As shown in FIG. 5C, at 2° of toe angle, the absolute difference between the pressures in the steering systems at about 35-40% trim has now decreased to about 1000 PSI. Because 1000 PSI is still greater than the calibrated value of 200 PSI, the controller 30 will again adaptively increase the toe angle.

Figure 5D:
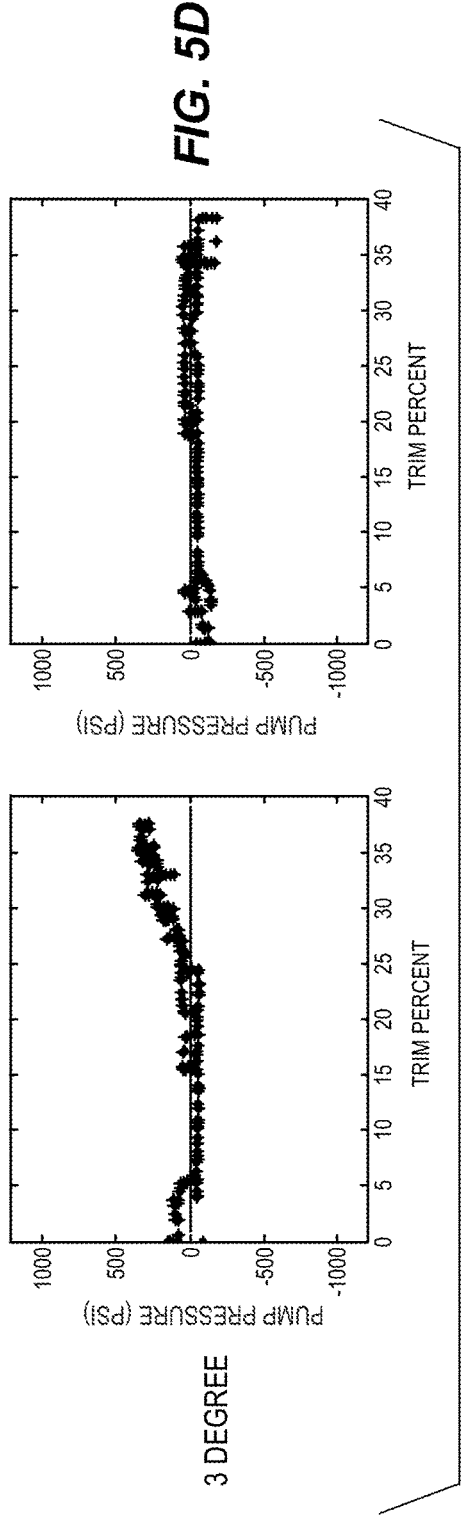

At 3° of toe angle, as shown in FIG. 5D, the absolute difference has decreased to about 250 PSI. Because 250 PSI is still greater than the calibrated value of 200 PSI, the controller 30 will again adaptively increase the toe angle.

Figure 5E:
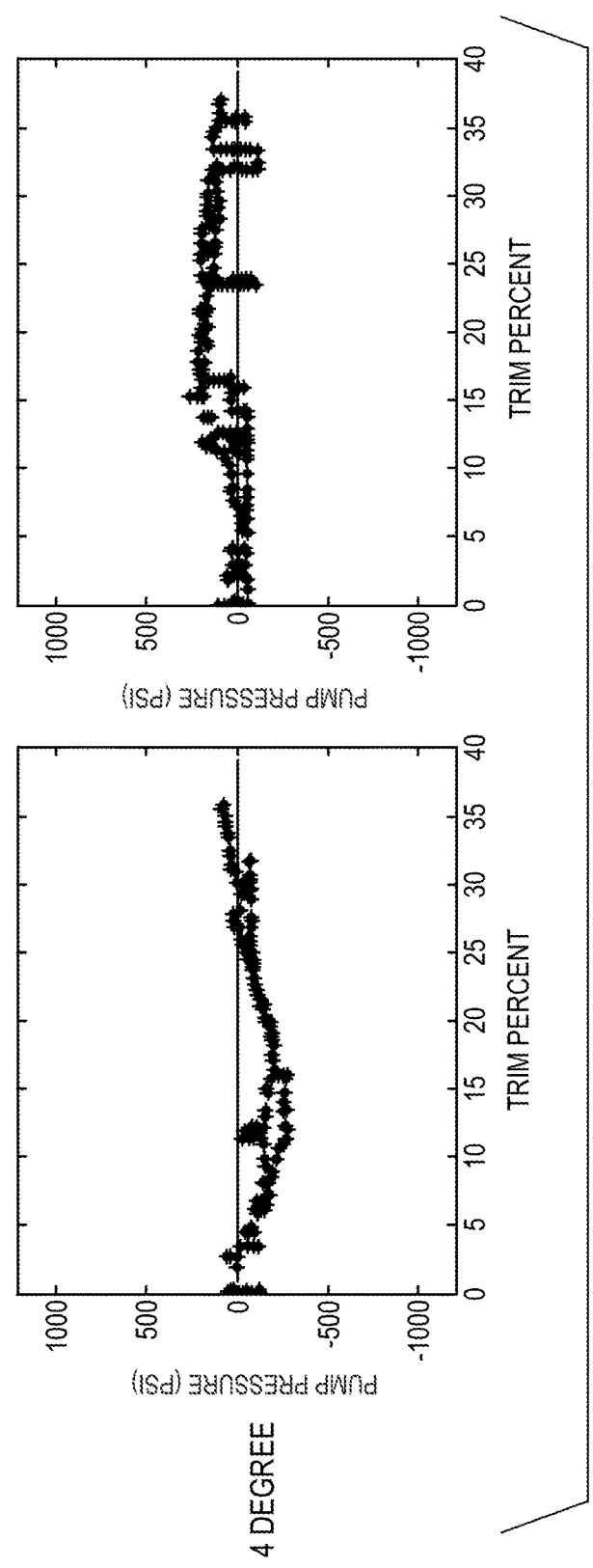

As shown in FIG. 5E, at 4° of toe angle, the steering pressures actually switch signs such that the port steering system has negative pressures at midrange trim angles, and the starboard steering system has positive pressures at midrange trim angles. This shows that adaptation of the toe angle has gone too far, and that somewhere between 3° and 4° of toe angle is in fact ideal for achieving a calibrated desired absolute difference of 200 PSI. This is why, as described above, the controller 30 may adapt the target toe angle by amounts that vary directly proportionally with the absolute difference between the first and second conditions. For instance, when the absolute difference between the pressure conditions is only 250 PSI, as in FIG. 5D, the controller may use smaller adaptation increments, such as for example 0.1°, until the measured actual pressure difference has decreased to the 200 PSI desired level. For example, the controller 30 may set the toe angle in turn to 3.1°, 3.2°, 3.3°, etc. and thereafter measure the resulting pressure difference. In other examples, the remaining difference between the actual absolute pressure difference and the calibrated absolute pressure difference may dictate the magnitude of the incremental steps used for toe angle adaptation.

It can also be seen from inspection of FIGS. 5A-5E that the trim percent value has an effect on the pump pressure required to maintain a particular steering angle. For example, as shown in FIG. 5A, at 0% trim and 0° toe angle, the absolute pressure difference between the port and starboard steering systems is less than 1000 PSI. However, at greater than 35% trim and 0° toe angle, the absolute pressure difference is greater than 2000 PSI. From inspection of FIGS. 5A-5E, it can be seen that as toe angle increases, the absolute difference between the steering pressures at the high and low ends of the trim position spectrum decreases. These graphs show that trim percent has an effect on the particular toe angle that will lead to efficient positioning of the marine propulsion devices. A similar effect on absolute pressure differences could be shown for other marine vessel or propulsion device operating conditions. For example, as vessel speed increases, steering pressures required o maintain a particular toe angle will also increase. These examples illustrate why adaptation of the toe angle is needed, because determining a toe angle based on only one or two operating conditions will not necessarily result in optimal steering system pressures.

The present system and method are especially effective at avoiding overwhelming of the steering actuators, especially when the marine vessel 10 is traveling at high speeds, when conditions such as crosswinds, crosscurrents and/or trim percentages of the marine propulsion devices can have a significant effect on the handling of the marine vessel 10. By having the controller 30 automatically, gradually, and continually adapt the toe angle of the marine propulsion devices 12a, 12b while the marine vessel 10 is traveling generally straight ahead, and by using this adapted toe angle when calculating any subsequent steering angles, the present system provides better handling of the marine vessel 10.

The present system and method will orient the propellers of the propulsion devices 12a, 12b so that they are most efficient at propelling the marine vessel 10, while the marine vessel 10 is underway and in real-time. The present system and method do not rely on pre-calibrated toe angles as being the sole source of data for selecting a toe angle; rather, the present system and method will adapt the toe angle determined using a toe angle map such that differential pressure between the steering systems is minimized because the propellers are at positions where hydrodynamic forces are minimized. The adapted toe angles can be saved, and the updated toe angle map can be used the next time the marine vessel 10 operates under the same operating conditions. The updated toe angle can itself be adapted during subsequent travel if need be. Alternatively, the updated toe angle is not saved in the toe angle map, but the pre-calibrated toe angle is adapted each time the marine vessel is travelling generally straight ahead.

The system and method of the present disclosure lessen the burden on a manufacturer or seller to calibrate a different toe angle for each individual vessel configuration. Additionally, the adapted toe angle will be more robust and will cause the vessel to operate more efficiently (i.e., there will be less drag on the propulsion devices and more thrust acting in a useful direction) because the adapted toe angle is based on real-time feedback. There is also a potential to increase the useful life of the steering system, as its duty cycle can be lessened because the steering actuators do not need to provide high pressures to maintain a calibrated toe angle that is not ideal for the particular vessel configuration.

The present system and method can be used for marine vessels equipped with more than two marine propulsion devices. If there are four propulsion devices, the two outer devices can be paired and a first toe angle between them can be adapted, and the two inner devices can be paired and a second toe angle between them adapted. In one example, the pressure difference of the first pair can be averaged with the pressure difference of the second pair, and the averaged value can be brought to the calibrated value by adjustment of the first and second toe angles. If three propulsion devices are provided, the controller may determine which direction to rotate the center propulsion device based on the direction of pressure in its steering actuator. According to the conventions discussed with respect to FIG. 3, if the pressure is negative, then the center propulsion device may be rotated clockwise, and if the pressure is positive, it may be rotated counterclockwise. The two outer propulsion devices can be paired and a toe angle between them adapted as described herein above.

In the above description, certain terms have been used for brevity, clarity, and understanding. No unnecessary limitations are to be inferred therefrom beyond the requirement of the prior art because such terms are used for descriptive purposes and are intended to be broadly construed. The different systems and method steps described herein may be used alone or in combination with other systems and methods. It is to be expected that various equivalents, alternatives and modifications are possible within the scope of the appended claims.

What is claimed is:

1. A system for reducing steering pressures of two or more steering actuators positioning two or more respective marine propulsion devices coupled to a marine vessel, the system comprising:
   a first sensor sensing a first condition indicative of a first pressure in a first steering actuator positioning a first marine propulsion device;
   a second sensor sensing a second condition indicative of a second pressure in a second steering actuator positioning a second marine propulsion device;
   a third sensor sensing an operating characteristic of the marine vessel; and
   a controller in signal communication with the first, second, and third sensors and receiving the first condition, the second condition, and the operating characteristic therefrom;
   wherein in response to the controller determining that the marine vessel is travelling generally straight ahead, the controller does the following:

(a) determines a target toe angle between the first and second marine propulsion devices based on the operating characteristic;
(b) commands the first and second steering actuators to position the first and second marine propulsion devices at the target toe angle;
(c) calculates an absolute difference between the first pressure in the first steering actuator and the second pressure in the second steering actuator;
(d) determines whether an actual toe angle between the first and second marine propulsion devices should be increased or decreased in order to reduce the absolute difference between the first and second pressures;
(e) thereafter commands the first and second steering actuators to increase or decrease the actual toe angle based on the determination in step (d);
(f) thereafter repeats steps (c), (d), and (e) until determining that the absolute difference between the first and second pressures is reduced to a calibrated target pressure value; and
(g) in response to the absolute difference reaching the calibrated target pressure value, ceases to command the first and second steering actuators to increase or decrease the actual toe angle.

2. The system of claim 1, wherein the controller determines first and second directions of pressure in the respective first and second steering actuators, and performs step (d) based on the first and second directions of pressure.

3. The system of claim 2, wherein the first and second steering actuators are hydraulic actuators and include respective first and second hydraulic cylinders coupled via first and second control valves to respective first and second pump-motor combinations.

4. The system of claim 3, wherein the controller determines the first and second directions of pressure in the respective first and second steering actuators based on signs of first and second currents provided to the respective first and second control valves.

5. The system of claim 4, wherein the first and second sensors are pressure sensors sensing first and second magnitudes of pressure in the respective first and second steering actuators.

6. The system of claim 4, wherein the first and second sensors are current sensors sensing first and second currents provided to the respective first and second pump-motor combinations; and
wherein the controller calculates first and second magnitudes of pressure in the respective first and second steering actuators based on the first and second currents provided to the respective first and second pump-motor combinations.

7. The system of claim 1, further comprising an input device providing a desired turning angle of the marine vessel to the controller;
wherein the controller determines that the marine vessel is travelling generally straight ahead in response to the desired turning angle being within a given deadband of zero; and
wherein the controller performs step (f) only as long as the marine vessel is travelling generally straight ahead.

8. The system of claim 1, wherein the operating characteristic is a speed of the marine vessel.

9. The system of claim 1, wherein the controller saves an actual toe angle at which the absolute difference between the first and second pressures reaches the calibrated target pressure value as an updated target toe angle associated with a particular value of the operating characteristic.

10. The system of claim 1, wherein the controller determines a rate at which to increase or decrease the actual toe angle based on the absolute difference between the first and second pressures.

11. A method for reducing steering pressures of two or more steering actuators positioning two or more respective marine propulsion devices coupled to a marine vessel, the method comprising:
sensing a first condition indicative of a first pressure in a first steering actuator positioning a first marine propulsion device;
sensing a second condition indicative of a second pressure in a second steering actuator positioning a second marine propulsion device;
sensing an operating characteristic of the marine vessel;
determining with a controller whether the marine vessel is travelling generally straight ahead; and
in response to determining that the marine vessel is travelling generally straight ahead:
(a) with the controller, determining a target toe angle between the first and second marine propulsion devices based on the operating characteristic;
(b) with the controller, commanding the first and second steering actuators to position the first and second marine propulsion devices at the target toe angle;
(c) with the controller, calculating an absolute difference between the first pressure in the first steering actuator and the second pressure in the second steering actuator;
(d) with the controller, determining whether an actual toe angle between the first and second marine propulsion devices should be increased or decreased in order to reduce the absolute difference between the first and second pressures;
(e) with the controller, commanding the first and second steering actuators to increase or decrease the actual toe angle based on the determination in step (d);
(f) thereafter repeating steps (c), (d), and (e) until determining that the absolute difference between the first and second pressures is reduced to a calibrated target pressure value; and
(g) in response to the absolute difference reaching the calibrated target pressure value, ceasing to command the first and second steering actuators to increase or decrease the actual toe angle.

12. The method of claim 11, further comprising determining first and second directions of pressure in the respective first and second steering actuators with the controller, and performing step (d) based on the first and second directions of pressure.

13. The method of claim 12, wherein the first and second steering actuators are hydraulic actuators and include respective first and second hydraulic cylinders coupled via first and second control valves to respective first and second pump-motor combinations; and further comprising:
with the controller, determining the first and second directions of pressure in the respective first and second steering actuators based on signs of first and second currents provided to the respective first and second control valves;
with first and second pressure sensors, sensing first and second magnitudes of pressure in the respective first and second steering actuators;

with the controller, determining the absolute difference between the first and second pressures based on the first and second magnitudes of pressure and based on the first and second directions of pressure; and with the controller, determining a rate at which to increase or decrease the actual toe angle based on the absolute difference between the first and second pressures.

14. The method of claim 12, wherein the first and second steering actuators are hydraulic actuators and include respective first and second hydraulic cylinders coupled via first and second control valves to respective first and second pump-motor combinations; and further comprising:

with the controller, determining the first and second directions of pressure in the respective first and second steering actuators based on signs of first and second currents provided to the respective first and second control valves;

with first and second current sensors, sensing first and second currents provided to the respective first and second pump-motor combinations;

with the controller, calculating first and second magnitudes of pressure in the respective first and second steering actuators based on the first and second currents provided to the respective first and second pump-motor combinations;

with the controller, determining the absolute difference between the first and second pressures based on the first and second magnitudes of pressure and based on the first and second directions of pressure; and with the controller, determining a rate at which to increase or decrease the actual toe angle based on the absolute difference between the first and second pressures.

15. The method of claim 11, further comprising saving an actual toe angle at which the absolute difference between the first and second pressures reaches the calibrated target pressure value as an updated target toe angle associated with a particular value of the operating characteristic in a memory of the controller.

16. The method of claim 15, further comprising commanding, with the controller, the first and second steering actuators to position the first and second marine propulsion devices at the updated target toe angle upon subsequently sensing the particular value of the operating characteristic.

17. The method of claim 11, further comprising determining the target toe angle with the controller based on at least two operating characteristics of the marine vessel.

18. The method of claim 11, wherein the operating characteristic is a vessel speed.

19. The method of claim 11, further comprising:
receiving a desired turning angle of the marine vessel from an input device;
determining that the marine vessel is travelling generally straight ahead in response to the desired turning angle being within a given deadband of zero; and
performing step (f) with the controller only as long as the marine vessel is travelling generally straight ahead.

* * * * *